United States Patent [19]
Peng

[11] Patent Number: 4,887,484
[45] Date of Patent: Dec. 19, 1989

[54] STEERING WHEEL ASSEMBLY

[76] Inventor: Hsiang Peng, 2 Fl., No. 1, Lane 378, Sec. 1, Mu Cha Rd., Taipei, Taiwan

[21] Appl. No.: 369,951

[22] Filed: Jun. 22, 1989

[51] Int. Cl.⁴ .......................... G05G 1/10; B60R 25/02
[52] U.S. Cl. .......................................... 74/556; 74/552; 70/252; 70/203; 70/237
[58] Field of Search ................ 74/552, 554, 556; 70/252, 209, 237; 29/159 B; 280/750, 777, 778

[56] References Cited

U.S. PATENT DOCUMENTS

| | | | |
|---|---|---|---|
| 1,255,136 | 2/1918 | Cooper | 70/209 |
| 1,335,865 | 4/1920 | Vincent | 70/209 |
| 1,340,638 | 5/1920 | Vodoz | 70/209 |
| 1,442,120 | 1/1923 | Brasket | 70/209 |
| 1,445,053 | 2/1923 | Vincent | 74/556 X |
| 1,449,563 | 3/1923 | Vincent | 74/556 |
| 1,459,040 | 6/1923 | Vincent | 74/556 |
| 1,459,090 | 6/1923 | Donaldson | 74/559 X |
| 1,468,324 | 9/1923 | Potchernick | 74/556 X |
| 1,476,742 | 12/1923 | Vincent | 70/209 X |
| 4,601,182 | 7/1986 | Glanzmann | 70/252 |

FOREIGN PATENT DOCUMENTS

| | | | |
|---|---|---|---|
| 914344 | 4/1954 | Fed. Rep. of Germany | 74/552 |
| 2174344 | 11/1986 | United Kingdom | 70/252 |

Primary Examiner—Vinh T. Luong
Attorney, Agent, or Firm—Bacon & Thomas

[57] ABSTRACT

A steering wheel assembly including a detachable rim part and a central hub which are connected through linking mechanisms. Both the rim part and the hub are hollow and have integral spokes which have respective oblique ends and elongate slots thereon. The elongate slots on the spokes of the rim part further extend to form a receiving hole. The linking mechanism includes a sliding block, a fixing plate and a spring. The spring is interconnected between the central hub and one end of the sliding block. The fixing plate is hinged to another end of the sliding block and has a protuberance on it. The sliding block is slidable within hollow portions of the spokes with the protuberance of the fixing plate engageable to the receiving hole on the spokes of the rim part so that the rim part is releasably securable to the central hub which forms part of a steering shaft or is fixedly engaged thereto.

1 Claim, 4 Drawing Sheets

STEERING WHEEL ASSEMBLY

BACKGROUND OF THE INVENTION

The present invention relates generally to steering wheel assembly. More particularly, the present invention relates to such steering wheel assembly which is composed of a detachable outer rim part and a central hub part of a steering shaft for being fixedly mounted on the steering shaft for security purposes.

Various steering wheel locking mechanisms have been utilized, either internally or externally, for purposes of securing the steering wheel. The idea basically focuses on preventing the steering wheel from being turned so that it is impossible to drive the vehicle. These kind of locking mechanisms are generally provided with additional lock devices which are constructed in such a way as to effectively preventing them from being forced open. While such kind of locking mechanisms are generally effective, they have the drawbacks of complicated construction and expensive for installation costs.

This invention discloses an entirely different steering wheel assembly having more reliable and effective security provisions.

SUMMARY OF THE INVENTION

A primary object of the present invention is to provide a steering wheel assembly which comprises a detachable rim part of the steering wheel for easy dismounting from a central hub of a steering shaft when the car is not in use.

This and additional objects, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENT

Figure 1:
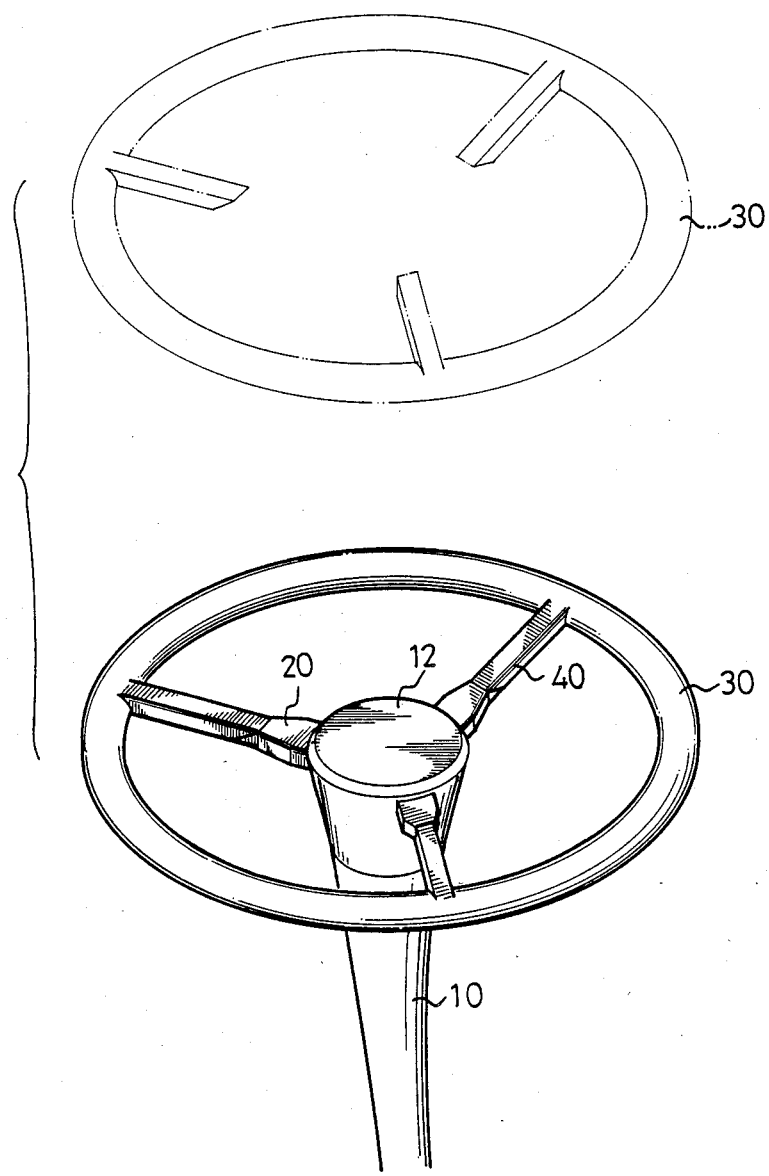
FIG. 1 is a perspective view showing a steering wheel assembly of the present invention fixedly mounted on a steering shaft, a detachable outer rim part thereof being shown in phantom lines for clarity.
Figure 2:
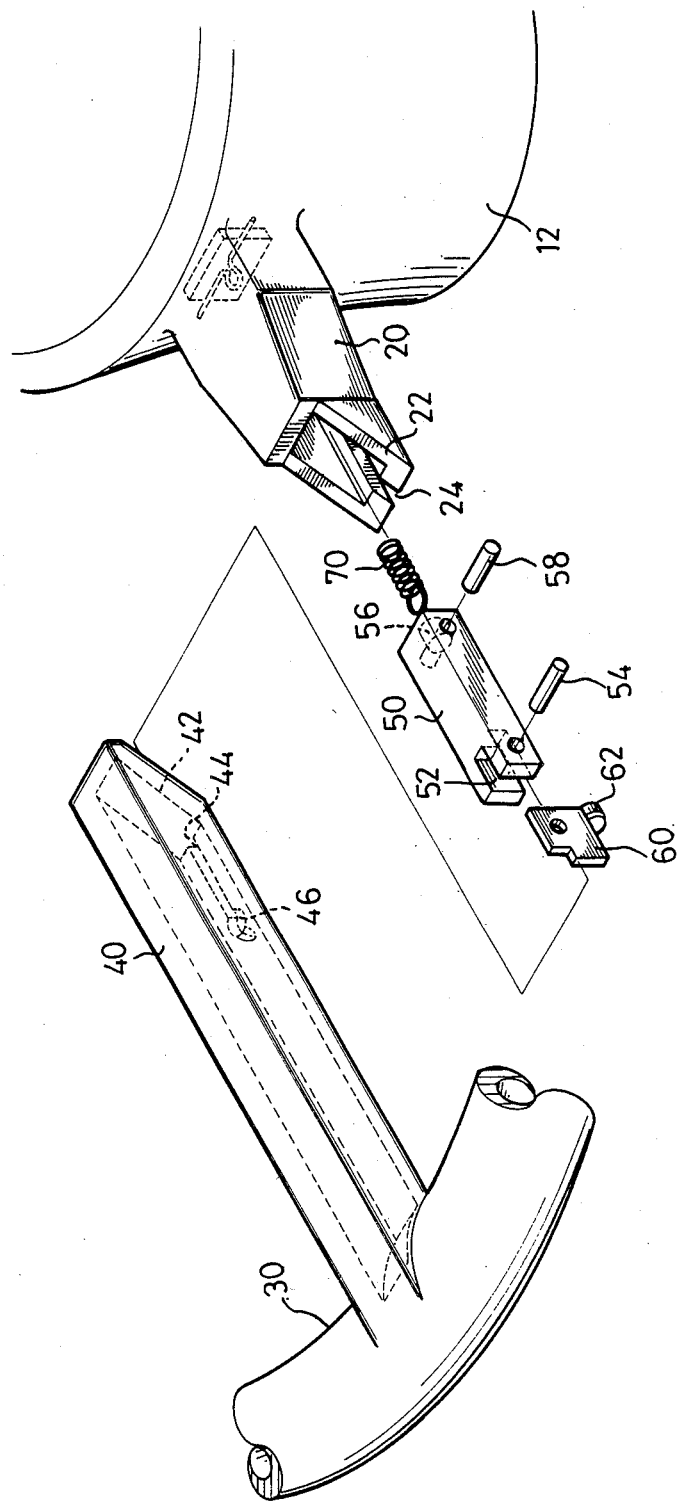
FIG. 2 is a partly cutaway exploded view of the steering wheel assembly of FIG. 1.

Referring now to the drawings, and more particularly to FIGS. 1 and 2, there is shown the steering wheel assembly which incorporates the preferred embodiment of the present invention. The steering wheel assembly comprises a central hub 12 having a plurality of inner spokes 20 integrally formed thereon, a rim part 30 having a plurality of outer spokes integrally formed thereon, and respective linking means interconnected between the inner spoke 20 and the outer spoke 40. The central hub 12 is preferably a separate element fixedly mounted on a steering shaft 10.

The inner spokes 20 each radially extend from the central hub 12 to the rim part 30. The inner spokes 20 each form a first oblique surface 22 at a free end thereof. The inner spokes 20 each are hollow and have a first elongate slot 24 formed on a bottom wall thereof.

The outer spokes 40 are corresponding in number to the inner spokes 20. The outer spokes 40 each are radially extended from the rim part 30 in a direction collinear to the general direction of the corresponding inner spoke 20. Each outer spoke 40 forms a second oblique surface 42 at a free end thereof. The outer spokes 40 each are hollow and have a second elongate slot 44 with an adjacent receiving hole 46. It is noted that each of the outer spokes 40 is aligned with corresponding inner spoke 20 when the rim part 30 is mounted on the central hub 12. It is also noted that the first and second oblique surfaces 22, 42 can be any suitable crooked shape such that the outer spoke 40 can be easily aligned with corresponding inner spoke 20.

Figure 3:
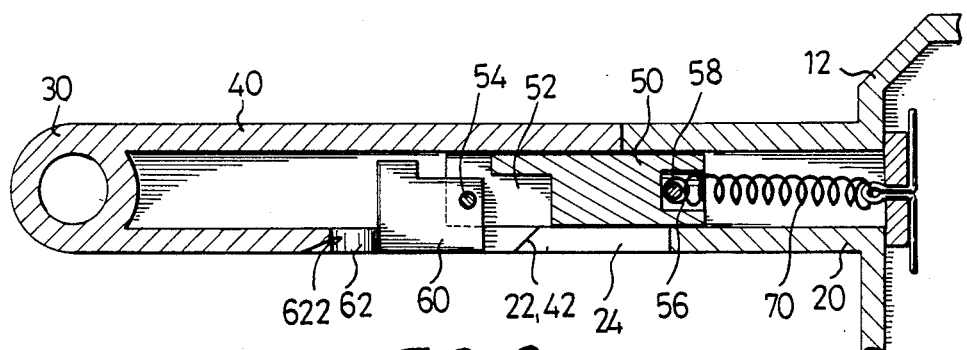
FIG. 3 is a cross-sectional view showing an arm portion of the present invention in an engaged state.
Figure 4:
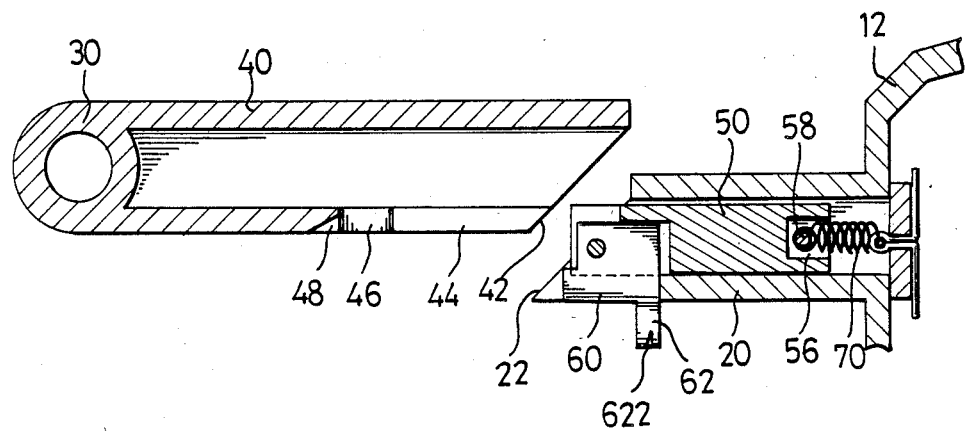
FIG. 4 is a view similar to FIG. 3, but showing an arm portion of the present invention in a disengaged state.
Figure 5:
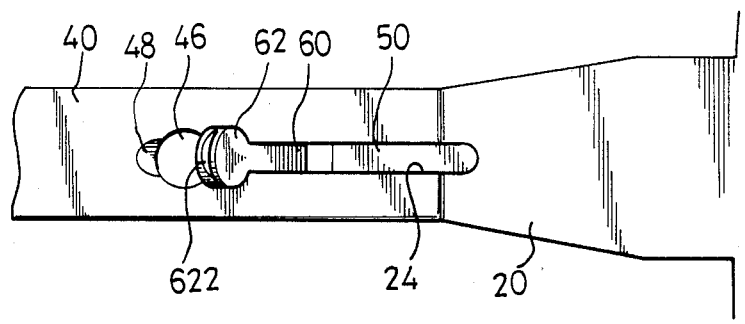
FIG. 5 is a bottom view taken in FIG. 3, in which the fixing plate is released.

Referring to FIGS. 2 to 4, the linking means for engaging the outer spoke 40 with the inner spoke 20 is disposed between the first and outer spokes 20, 40. The linking means substantially comprises a sliding block 50, a fixing plate 60 and a spring 70. The spring 70 is interconnected between the central hub 12 and one end of the sliding block 50. In this embodiment, the connection between the spring 70 and the sliding block 50 can be achieved by forming a hole 56 on the sliding block 50 for receiving one end of the spring 70 and then inserting a pin 58 through both the sliding block 50 and the spring 70. The fixing plate 60, which has a protuberance 62 thereon, is hinged to another end of the sliding block 50. In this embodiment, the pivotal connection between the fixing plate 60 and the sliding block 50 is achieved by disposing a groove 52 on the sliding block 50 and by inserting a pin through both the sliding block 50 and the fixing plate 60. The protuberance 62 has a recess 622 thereon and adjacent to the recess 622 a further recess 48 is provided for ease of operation, as best shown in FIGS. 4 and 5.

Referring to FIGS. 3 and 4, the fixing plate 60 is engageable with the receiving hole 46 when in the engaged state, shown in FIG. 3, in which the protuberance 62 on the fixing plate 60 is received in the receiving hole 46 on the outer spoke 40 with the spring 70 being stretched such that the rim part 30 is securely mounted on the central hub 12. The rim part 30 is releasable from the central hub 12 by releasing the fixing plate 60 from the elongate slot 44 on the rim part 40 so that the spring 70 pulls the sliding block 50 to a position substantially as shown in FIG. 4.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A steering wheel assembly comprising:
   a central hub having a plurality of inner spokes integral to said central hub, said central hub being part of a steering shaft, said inner spokes each being radially extended from said central hub and having a first oblique surface at a free end thereof, said inner spokes each being hollow and having a first elongate slot formed thereon;
   a rim part having a plurality of outer spokes integral to said rim part, said plurality of outer spokes being corresponding in number to said inner spokes, said outer spokes each being radially extended from said rim part and having a second oblique surface at a free end thereof, said outer spokes each being hollow and having a second elongate slot with an adjacent receiving hole; each of said outer spokes being alignable with a corresponding inner spoke; and respective linking means for engaging said outer spoke with said inner spoke; said linking means comprising a sliding block, a fixing plate and a spring; said spring being interconnected between said central hub and one end of said sliding block, said fixing plate being hinged to another end of said sliding block and having a protuberance thereon, said sliding block being slidable within both said inner and outer spokes, said fixing plate being slidable within said first and second elongate slots and being releasably engageable with said receiving hole of said outer spoke.

* * * * *